(12) United States Patent
Unger et al.

(10) Patent No.: US 10,304,483 B1
(45) Date of Patent: May 28, 2019

(54) SLIDER ADHESION SYSTEM

(71) Applicant: Seagate Technology LLC, Cupertino, CA (US)

(72) Inventors: Christopher Unger, Chanhassen, MN (US); Bradley J. Ver Meer, Savage, MN (US); Ravishankar Ajjanagadde Shivarama, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/848,312

(22) Filed: Dec. 20, 2017

(51) Int. Cl.
*G11B 5/48* (2006.01)
*G11B 5/60* (2006.01)

(52) U.S. Cl.
CPC ............ *G11B 5/4826* (2013.01); *G11B 5/483* (2015.09); *G11B 5/6005* (2013.01)

(58) Field of Classification Search
CPC ...... G11B 5/4826; G11B 5/483; G11B 5/6005
USPC ...... 360/234.6, 294.1, 294.4, 245.3
See application file for complete search history.

(56) References Cited

U.S. PATENT DOCUMENTS

| | | |
|---|---|---|
| 5,774,305 A | 6/1998 | Boutaghou |
| 6,215,629 B1 * | 4/2001 | Kant ................... G11B 5/5552 360/290 |
| 6,801,398 B1 | 10/2004 | Ohwe et al. |
| 6,965,499 B1 * | 11/2005 | Zhang ................. G11B 5/4833 360/234.8 |
| 7,057,857 B1 * | 6/2006 | Niu ....................... G11B 5/4826 360/245.4 |
| 8,014,103 B2 * | 9/2011 | Ohsawa ................. G11B 5/486 360/234.5 |
| 8,797,690 B2 | 8/2014 | Tao et al. |
| 8,797,691 B1 * | 8/2014 | Tian ...................... G11B 5/483 360/245.3 |
| 8,901,940 B2 | 12/2014 | Provenzano et al. |
| 2006/0203389 A1 * | 9/2006 | Motonishi ............ G11B 5/4826 360/234.6 |
| 2006/0291102 A1 * | 12/2006 | Honda .................. G11B 5/4826 360/245.7 |
| 2009/0244786 A1 * | 10/2009 | Hatch ................... G11B 5/4833 360/294.4 |
| 2010/0259851 A1 * | 10/2010 | Yao ....................... G11B 5/4826 360/245.3 |
| 2011/0096438 A1 | 4/2011 | Takada et al. |

* cited by examiner

*Primary Examiner* — Jefferson A Evans
(74) *Attorney, Agent, or Firm* — Hall Estill Attorneys at Law

(57) ABSTRACT

A slider adhesion system can be practiced in a data storage device with a flexure suspended from a load beam and a slider mounted to a gimbal tongue of the flexure. The slider can be aligned with an aperture of the gimbal tongue and attached to an adhesion feature of the gimbal tongue with an adhesive layer. The adhesion feature may consist of a plurality of cantilevered tabs extending into the aperture of the gimbal tongue.

20 Claims, 5 Drawing Sheets

SLIDER ADHESION SYSTEM

SUMMARY OF THE INVENTION

In accordance with some embodiments, a data storage device employs a slider adhesion system with a flexure suspended from a load beam and a slider mounted to a gimbal tongue of the flexure. The slider is aligned with an aperture of the gimbal tongue and attached to an adhesion feature of the gimbal tongue with an adhesive layer. The adhesion feature consists of a plurality of cantilevered tabs extending into the aperture of the gimbal tongue.

A slider adhesion system, in other embodiments, has a flexure suspended from a load beam and a slider mounted to a gimbal tongue of the flexure. The slider is aligned with an aperture of the gimbal tongue and a microactuator physically connects the gimbal tongue to a flexure body. An adhesive layer attaches the slider to an adhesion feature of the gimbal tongue where the adhesion feature is configured as a plurality of cantilevered tabs extending into the aperture of the gimbal tongue.

Various embodiments suspend a flexure from a load beam and mount a slider to a gimbal tongue of the flexure with an adhesive layer with the slider aligned with an aperture of the gimbal tongue. The adhesive layer attaches the slider to an adhesion feature of the gimbal tongue with the adhesion feature consisting of a plurality of cantilevered tabs extending into the aperture of the gimbal tongue. Activation of a transducing component of the slider conducts data access operations on a data storage medium separated from the slider by an air bearing.

DETAILED DESCRIPTION

Various embodiments are generally directed to data transducing assemblies of a data storage device that have optimized adhesion through the use of one or more adhesion features.

The evolution of data storage devices over time has resulted in greater data capacities, but necessitate data accessing components to be more precise to provide accurate and efficient data accesses. Technological advancements that can increase the areal data density of a data storage device can be difficult to implement, practically, while maintaining precise and efficient data access operation. For instance, implementation of write-assist technology to a transducing head can increase data access speed and resolution, but can correspond with a slider that is physically larger than conventional slider components, which can be difficult to reliably adhere to a gimbal tongue in a head gimbal assembly.

With these issues in mind, a data storage device, in some embodiments, has a gimbal flexure with an adhesion feature that optimizes the mounting and use of a slider to conduct data access operations. The ability to customize the number and configuration of adhesion features on a gimbal flexure provides reliable physical connection despite the flexure having reduced surface area due to the configuration of the slider. For example, the flexure can be configured with an aperture that reduces the amount of surface area available to attach the slider and a plurality of cantilevered tabs can be utilized to increase slider-flexure adhesion and provide precise slider movement, along with accurate data access operations.

Figure 1:
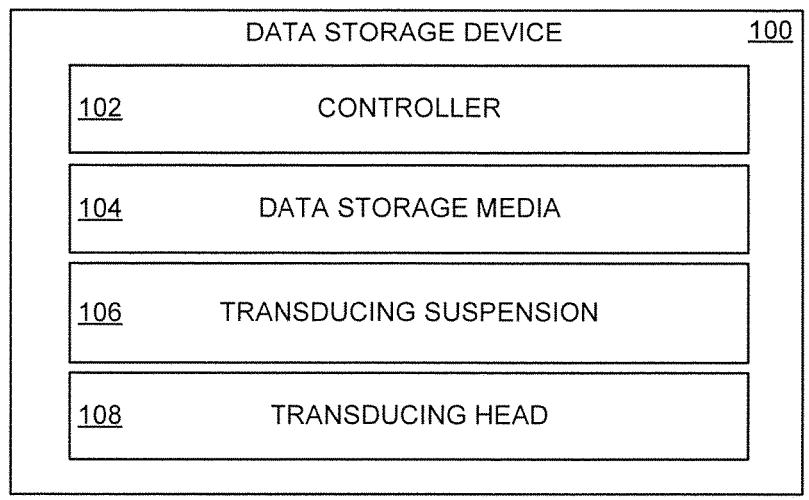
FIG. 1 is a block representation of an example data storage device in which various embodiments may be practiced.

Turning to the drawings, FIG. 1 is a block representation of an example data storage device 100 in which various embodiments may be practiced. The data storage device 100 may be employed in a stand-alone capacity, such as in a desktop computer, or in a network capacity, such as in a cloud computing rack with other devices.

The data storage device 100 can have at least one local controller 102, such as a microprocessor or programmable processor, that directs data access operations to, and from, magnetic data storage media 104. The media 104 can be rotated as directed by the controller 102 to allow a transducing suspension 106 to position a transducing head 108 over a selected region of the media 104 to write, or read, data. It is contemplated that the data storage device 100 can concurrently employ other types of data storage, such as volatile or non-volatile solid-state memory, but such arrangement is not required.

Figure 2:
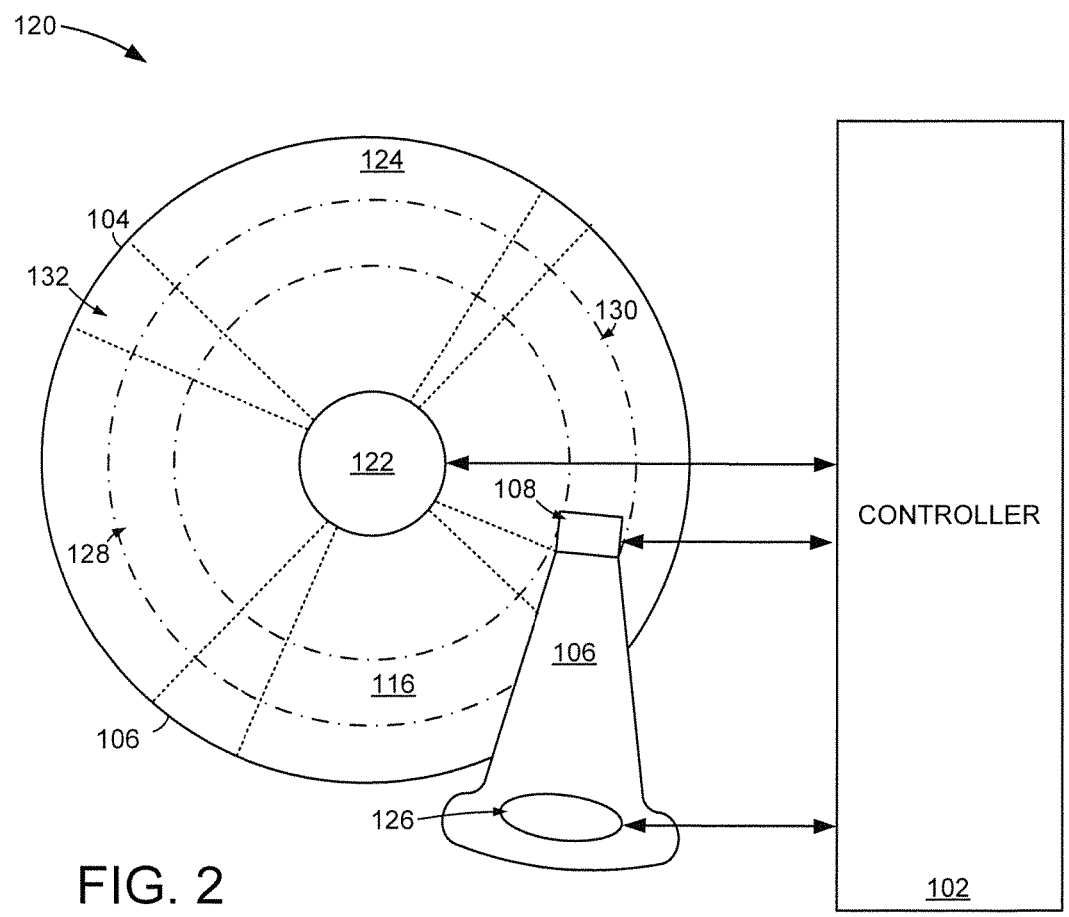
FIG. 2 displays a line representations of portions of an example data storage device arranged in accordance with some embodiments.

FIG. 2 illustrates a line representation of portions of an example data storage device 120 configured in accordance with some embodiments. The data storage device 120 has a plurality of separated data storage media 104 mounted on a central spindle 122. The transducing suspension 106 can position a transducing head 108 proximal to respective top and bottom recording surfaces 124 of each data storage medium 104.

Movement of the transducing assembly 106 can be facilitated by a voice coil motor 126 that articulates to position each head 108 over a selected data track 128, which may have user data regions 130 as well as servo region 132 protected from user use. As shown, the servo regions 132 can be collectively arranged in servo tracks that radially extend from the spindle 122 while the user data regions 130 are circumferentially arranged relative to the spindle 122. It is noted that the entirety of the data storage device 120 of FIG. 2 can be collectively stored in a single housing, but such configuration is not required.

Figure 3A:
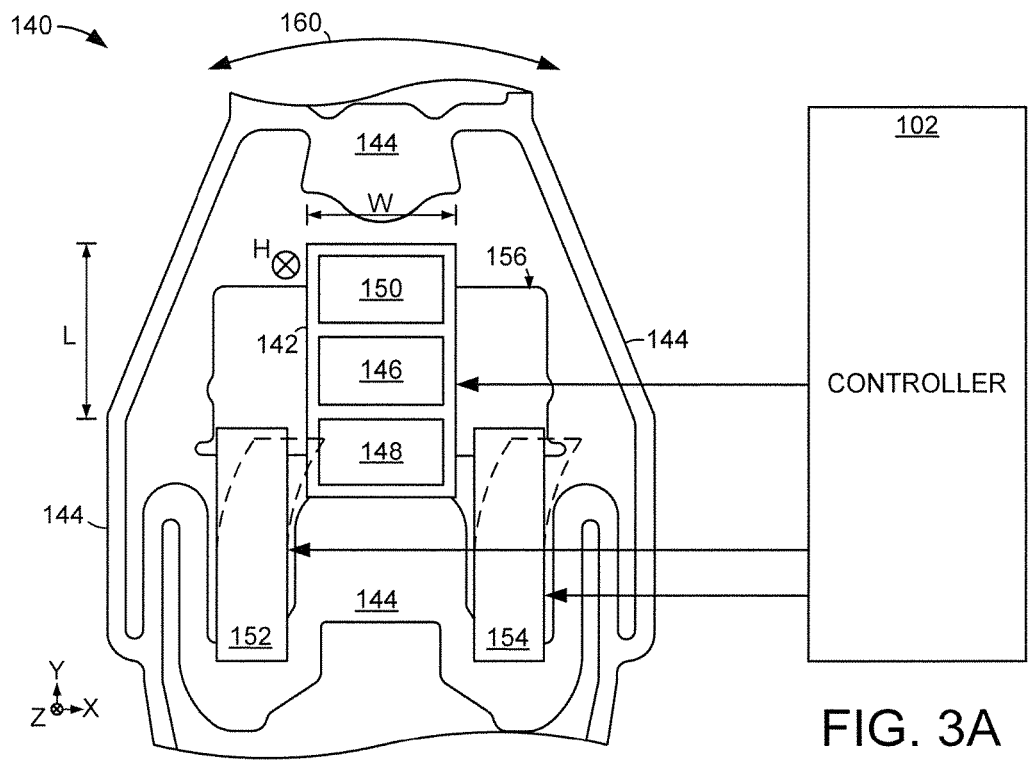
FIGS. 3A and 3B respectively show portions of an example transducing assembly configured in accordance with assorted embodiments.
Figure 3B:
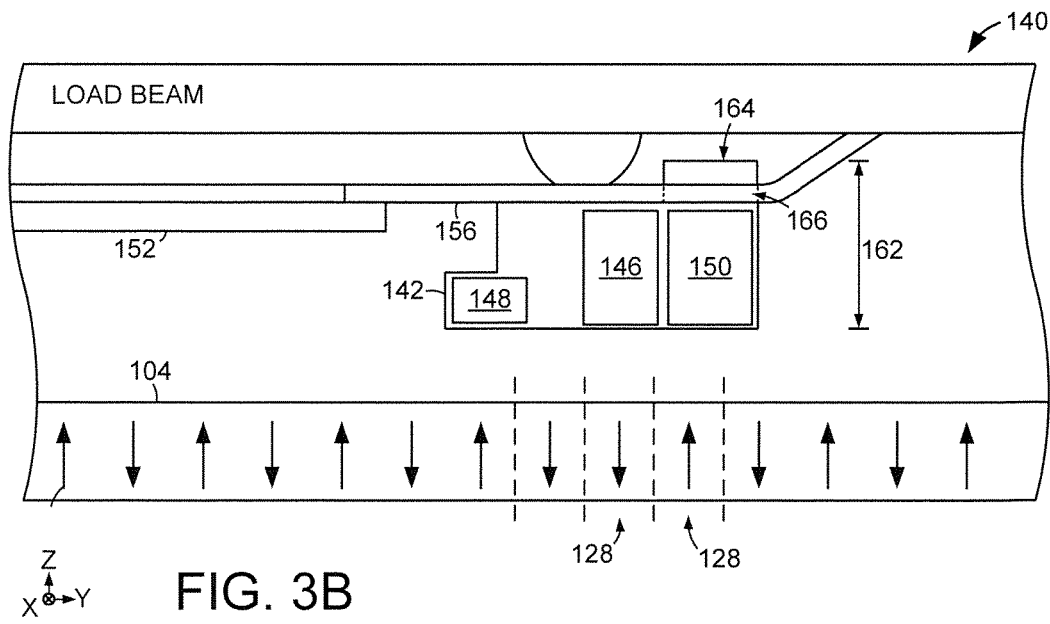

In the line representations of FIGS. 3A and 3B, portions of an example transducing suspension 140 are displayed. The air bearing view of FIG. 3A conveys how a slider 142 can be mounted to a gimbal flexure 144. The slider 142 is shaped to physically support an on-board data writer 146, a data reader 148, and a write-assist assembly 150 to allow efficient and accurate data access operation. That is, the slider 142 can have a length (L), width (W), and height (H) that allow the writer 146, reader 148, and write-assist assembly 150 to fly on an air bearing of a predetermined size despite encountering aspects that can degrade the air bearing size.

Coarse resolution movement of the slider 142 can be facilitated by the voice coil motor 126 fine resolution slider movement in the X-Y plane can be facilitated via microactuation from first 152 and second 154 actuating layers. As shown, the actuating layers 152/154 can physically extend from a gimbal tongue 156 portion of the flexure 144 to a body 158 portion of the flexure 144 to allow tilting of the slider 142, as illustrated by arrow 160. That is, a local, or remote, controller can activate one or more actuating layers 152/154 to induce physical movement, as displayed by segmented lines, which corresponds with gimbal tongue 156 movement.

It is contemplated that the slider 142 consists of a heater feature that can selectively articulate the slider 142 in the Y-Z plane, which can selectively control the size of the air bearing between the slider 142 and the underlying data storage medium. The write-assist assembly 150 is not limited to a particular type of technology or a number of constituent components, but can, in some embodiments, consist of a laser directed towards the data storage medium 104 via a waveguide in order to temporarily heat the medium 104 above its' Curie temperature.

FIG. 3B illustrates how the incorporation of the write-assist assembly 150 into the slider 142 can cause a varying slider/flexure interface. In other words, incorporation of the write-assist assembly 150 into the slider 142 results in a greater slider height than if the writer 146 and reader 148 where the only occupants of the slider 142.

It is noted that the increased slider height may result in a uniform or varying slider top surface 162 that is accommodated by an aperture 164 in the gimbal tongue 156. As displayed, but not required, portions of the slider 142, such as the top surface 162, can extend into, or through, the aperture 164. Alternatively, the gimbal tongue aperture 164 can be present without any of the slider 142 extending through. Regardless of the position of the slider top surface 162 relative to the tongue aperture 164, the presence of the aperture 164 decreases the amount of tongue 156 surface area available to mount the slider 142, which can result in degraded structural performance during operation.

Figure 4:
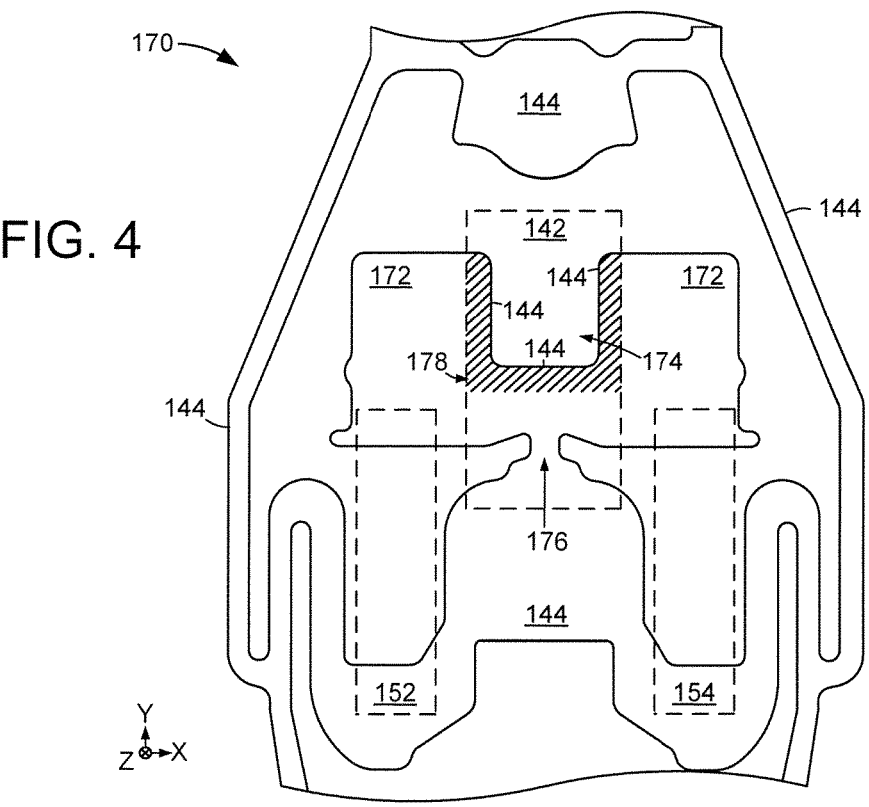
FIG. 4 illustrates portions of an example transducing suspension capable of being employed in the data storage devices of FIGS. 1 and 2.

FIG. 4 displays portions of an example transducing suspension 170 configured in accordance with various embodiments to accommodate a slider 142 with a write-assist assembly comprising at least a laser. The gimbal tongue 172 has a central aperture 174 that is aligned with the slider 142 so that less than all of the top surface of the slider 142 can be physically attached to the gimbal tongue 172.

The gimbal tongue 172 is arranged with a reduced width pivot region 176 that allows the respective actuating layers 152/154 to more efficiently enact slider 142 rotation in the X-Y plane. The reduced width region 176 and the aperture 174 provides relatively minimal tongue surface area for adhesive material to physically connect the slider 142 to the tongue 172, as shown by the exemplary cross-hatched region 178. Such reduced tongue-slider adhesive region 178, compared to if the tongue 172 had no aperture 174, can jeopardize the durability, reliability, and data access performance of the writer, reader, and write-assist components resident on the slider 142.

Figure 5A:
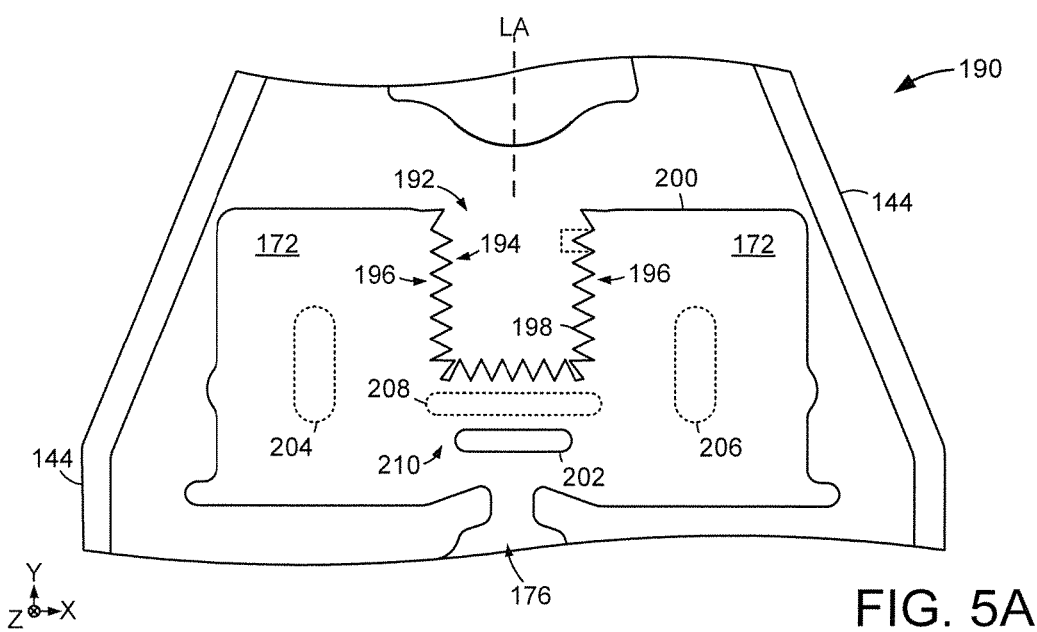
FIGS. 5A and 5B respectively depict portions of an example transducing suspension operated in accordance with some embodiments.
Figure 5B:
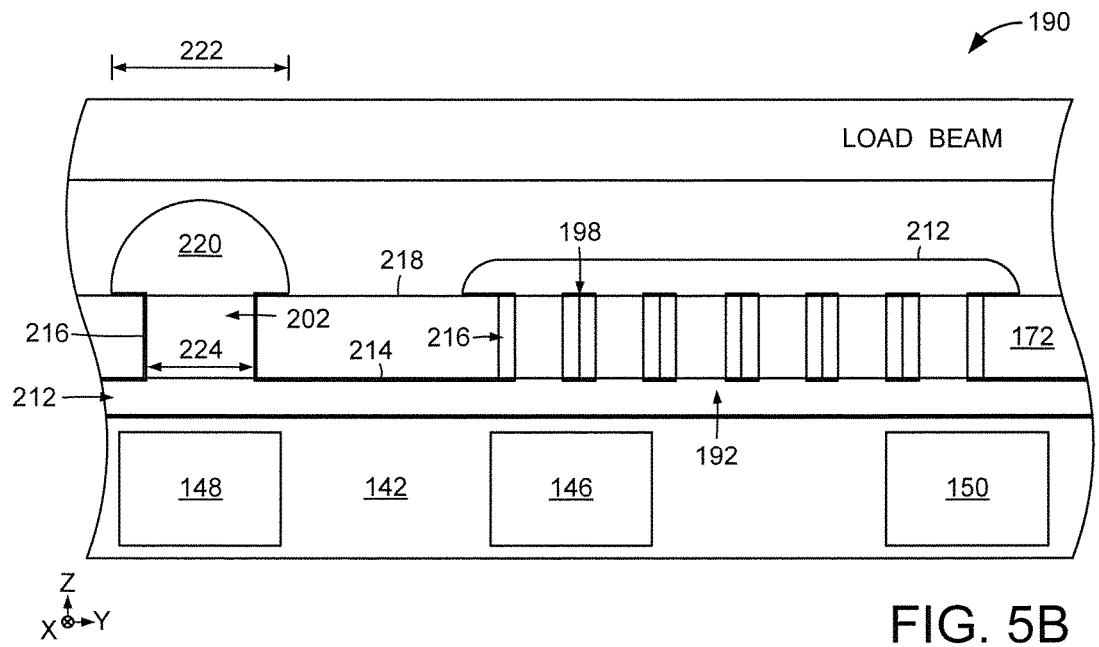

Accordingly, some embodiments are generally directed to incorporating adhesion features into the transducing suspension to increase the integrity of adhesion between the slider 142 and the gimbal tongue 172. FIGS. 5A and 5B respectively depict line representations of a portion of an example transducing suspension 190 that employs one or more adhesion features to optimize slider-tongue adhesion despite the presence of a tongue aperture 192. A first adhesion feature 194 is positioned at the boundary 196 of the tongue aperture 192 and consists of a plurality of cantilevered tabs 198.

FIG. 5A displays the how the aperture 192 is positioned on the gimbal tongue 172 of the flexure 144 from a corresponding data storage medium. Although not required or limiting, the aperture 192 has a rectangular shape and continuously extends from a leading edge 200 of the gimbal tongue 172 towards the reduced width pivot region 176. It is contemplated that the plurality of cantilevered tabs 198 can extend from any portion of the aperture boundary 196, such as throughout the entire length of the boundary 196 in the X-Y plane or less than all of the length of the boundary 196 in the X-Y plane.

The cantilevered tabs 198 can be tuned for size and shape to provide optimized adhesion between the gimbal tongue 172 and the slider 142. For instance, a cantilevered tab 198 can have a pointed shape, as shown in solid line, or have a rectangular shape, as shown in segmented line. Some embodiments configure the boundary 196 with differently configured cantilevered tabs 198, as illustrated by segmented lines, to increase the adhesion strength of an adhesive layer, such as heightened peel strength.

The cantilevered tabs 198 of the first adhesion feature 194 may be complemented, or replaced, by a second adhesion feature 202. While not required or limiting, the second adhesion feature 202 may be a hole that continuously extends through the gimbal tongue 172 at a position separated from the tongue aperture 192. The hole of the second adhesion feature 202 can be located anywhere on the gimbal tongue 172, as illustrated by segmented regions 204, 206, and 208, but is positioned symmetrically about a longitudinal axis (LA) of the gimbal tongue 172 and slider 142 in various embodiments, as shown by region 210.

Region 210 may partially, or completely, be covered by the slider 142 where the features 208/202 are vertically aligned with the slider 142 along the Z axis. The cross-sectional view of FIG. 5B conveys how the first 194 and second 202 adhesion features increase the surface area available for an adhesive layer 212 to bond the slider 142 to the gimbal tongue 172. In contrast to a continuous slider/tongue interface, the cantilevered tabs 198 of the first adhesion feature 194 allow the material of the adhesive layer 212 to continuously adhere to the bottom 214, sidewall 216, and top 218 surfaces of the gimbal tongue 172.

While a linear aperture boundary 196 without cantilevered tabs 198 may allow adhesion material to flow to the top gimbal surface 218, it can be appreciated that each cantilevered tab 198 increases the amount of top surface 218 area that can be utilized by the adhesive layer 212. The hole of the second adhesion feature 202 can also allow the adhesive layer 212 to continuously flow and adhere to the top tongue surface 218, which may result in an adhesion lug 220 bulging from the second adhesion feature 202 hole with a width 222 that is greater than the hole width 224.

It is contemplated that multiple separate second adhesion features 202 can be incorporated into various portions of the gimbal tongue 172. Such features 202 can have matching, or dissimilar, dimensions configured to provide optimized adhesion of the slider 142 to the tongue 172 without degrading the integrity or structural response to microactuation from the actuating layers 152/154.

Figure 6:
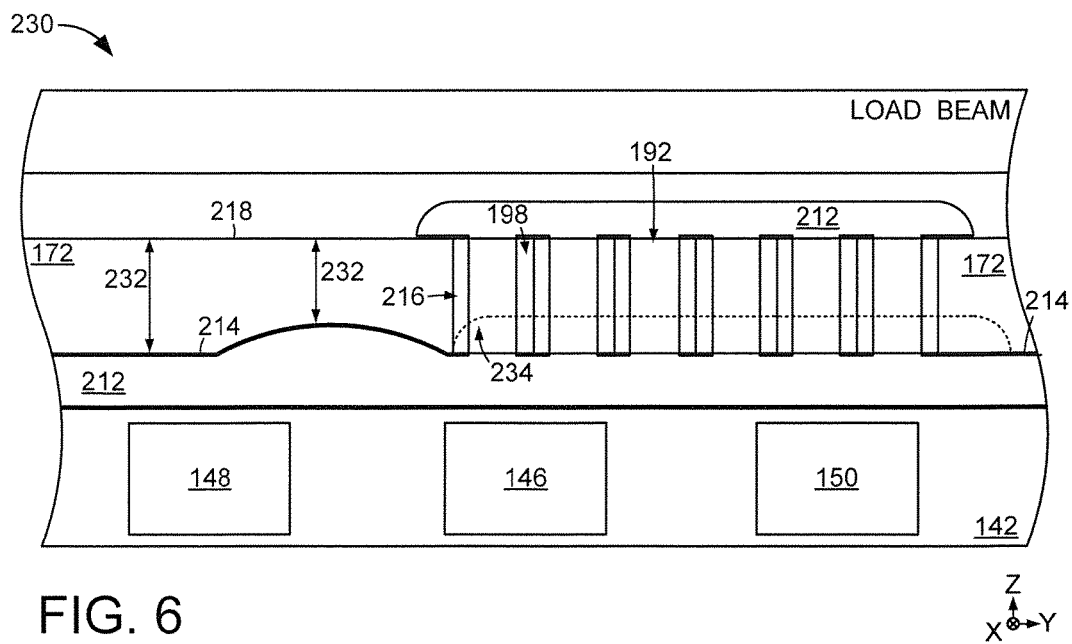
FIG. 6 displays a cross-sectional line representation of an example transducing suspension configured in accordance with various embodiments FIG. 7 provides a flowchart of an example data access routine that can be carried out by the assorted embodiments of FIGS. 1-6.

In some embodiments, the gimbal tongue 172 can be configured with a varying thickness, parallel the Z axis, to complement one or more adhesion features 194/202. FIG. 6 displays a cross-sectional view of a portion of an example transducing suspension 230 arranged with a varying gimbal tongue thickness 232. By reducing the tongue thickness 232 by contouring the bottom surface 214, as shown, the bonding behavior of the adhesive layer 212 can be controlled in an effort to promote adhesion material flow into each adhesion feature 194 and onto the tongue top surface 218.

That is, the contoured tongue bottom surface 214 can cause the material of the adhesive layer 212 to reliably flow into a single, continuous layer that contacts bottom 214, sidewall 216, and top 218 tongue surfaces during initial adhesive layer 212 placement, such as during transducing suspension 230 manufacturing where heat may, or may not, be applied to bond the slider 142 to the tongue 172. The non-limiting example varying tongue thickness 232 of FIG. 6 has a continuously curvilinear contour shape in the X-Z plane, as shown by segmented region 234, which can contain the adhesive layer 212 proximal the slider 142. However, other contoured shapes can be presented by the varying tongue thickness 232, such as rectangular, triangular, and combinations with curvilinear portions.

Figure 7:
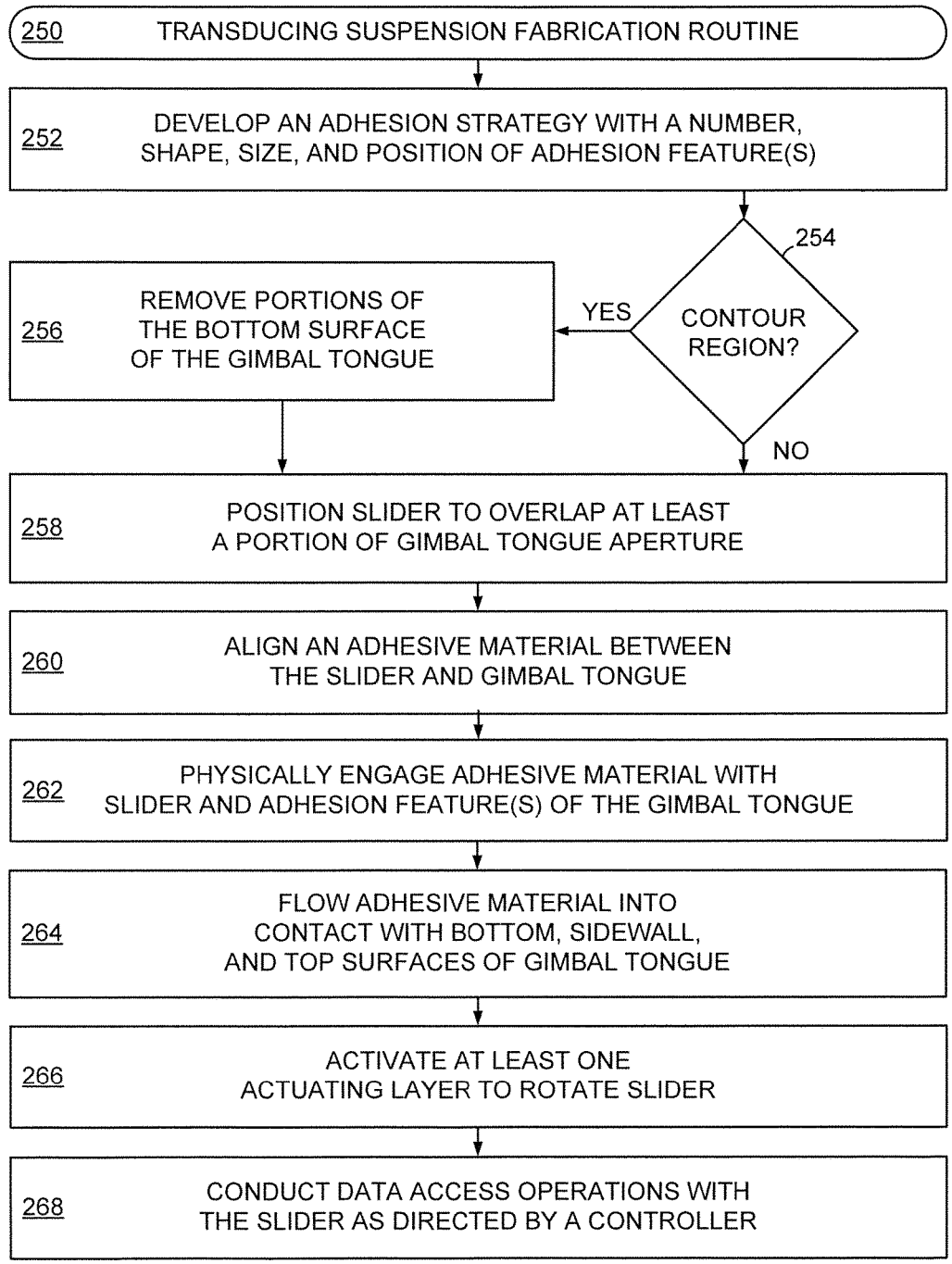

Hence, the gimbal tongue 172 can be configured with a number of different features 194/202/232 to increase the adhesion strength of the slider 142 to the gimbal tongue 172 despite the presence of the tongue aperture 192. FIG. 7 is a flowchart of an example transducing suspension fabrication routine 250 that can be conducts to construct a transducing suspension in accordance with the embodiments of FIGS. 3A-6. The routine 250 can begin with step 252 designing an adhesion strategy conducive to a data storage environment. That is, step 252 can choose a number, shape, size, and position of adhesion features in view of the size, components, and operation of a slider to be mounted to a gimbal tongue as well as the microactuation characteristics of the gimbal tongue.

As a result of step 252, a gimbal tongue having a tongue aperture, like aperture 192, can have optimized adhesion with a slider despite the presence of the tongue aperture and cyclic heating from any write-assist aspects of the slider. Step 252 may consider the use of one or more separate contoured tongue regions that are defined by a reduced tongue thickness. Decision 254 determines if contoured region(s) are to be incorporated into the gimbal tongue. If so, step 256 removes portions of the bottom surface of the gimbal tongue to form at least one contoured feature.

At the conclusion of step 256, or if no contoured feature is chosen from decision 254, a slider is vertically aligned with the gimbal tongue so that the slider overlaps with at least a portion of the tongue aperture in step 258. Step 260 then positions at least one adhesive layer between the slider and gimbal tongue prior to engaging contact with the tongue in step 262. It is noted that the adhesive layer may be a lamination of multiple different materials or a single-piece layer of a single material, without limitation.

The physical contact of the adhesive layer with the gimbal tongue in step 262 may automatically induce bonding and permanent attachment with the material of the adhesive layer continuously flowing to contact the bottom, sidewall, and top surfaces of the tongue proximal each adhesion feature in step 264. However, it is contemplated that step 264 provides an elevated temperature to promote flow of the adhesive layer throughout each adhesion feature. Once the adhesive layer sets into each adhesion feature, step 266 activates at least one actuating layer to induce tilting slider motion and precise articulation relative to a corresponding data storage surface of an adjacent magnetic data storage medium that allows data access operations, such as a data read or data write, to a single selected data track in step 268.

Through the customization of a gimbal tongue to incorporate one or more adhesion features, increased amounts of tongue surface area are available for adhesion compared to a feature-less gimbal tongue. The ability to tune the number, size, shape, and type of adhesion feature provides a single-piece adhesive layer to flow and contact bottom, sidewall, and top tongue surfaces to optimize adhesion between the slider and gimbal tongue even though the tongue has an aperture that reduces the potential tongue surface area. By utilizing one or more adhesion features, a slider that is aligned with a tongue aperture can have reliable adhesion to the gimbal tongue without compromising tongue structural integrity or tongue response to microactuation, which corresponds with optimal data access performance from a transducing suspension.

What is claimed is:

1. An apparatus comprising:
a flexure suspended from a load beam;
a slider mounted to a tongue of the flexure, the slider aligned with an aperture of the tongue;
a first microactuator connecting the gimbal tongue to a flexure body;
a second microactuator connecting the gimbal tongue to a flexure body; and
an adhesive layer attaching the slider to a first adhesion feature of the gimbal tongue, the first adhesion feature comprising a plurality of cantilevered tabs extending into the aperture of the gimbal tongue.

2. The apparatus of claim 1, wherein the suspended proximal a recording surface of a data storage medium.

3. The apparatus of claim 1, wherein each of the plurality of cantilevered tabs has a triangular shape.

4. The apparatus of claim 1, wherein a first tab of the plurality of cantilevered tabs has a different shape than a second tab of the plurality of cantilevered tabs.

5. The apparatus of claim 1, wherein the aperture continuously extends from a leading edge of the tongue towards a reduced width pivot region of the flexure.

6. The apparatus of claim 5, wherein the aperture has a boundary with and the plurality of cantilevered tabs continuously extend to less than all of an overall length the boundary.

7. The apparatus of claim 5, wherein the aperture has a boundary with and the plurality of cantilevered tabs continuously extends throughout an overall length of the boundary.

8. The apparatus of claim 1, wherein the adhesive layer continuously extends to physically contact bottom, sidewall, and top surfaces of the tongue.

9. The apparatus of claim 1, wherein the adhesive layer contacts a top surface of each of the plurality of cantilevered tabs.

10. The apparatus of claim 1, wherein a second adhesion feature is physically separated from the first adhesion feature on the tongue, the second adhesion feature comprising a hole extending through the tongue.

11. The apparatus of claim 10, wherein the adhesive layer continuously extends through the hole to form a lug contacting a top surface of the tongue.

12. The apparatus of claim 10, wherein the first and second adhesion features are symmetrical about a longitudinal axis of the tongue.

13. A system comprising:
a flexure suspended from a load beam;

a slider mounted to a gimbal tongue of the flexure, the slider aligned with an aperture of the gimbal tongue;

a microactuator connecting the gimbal tongue to a flexure body; and an adhesive layer attaching the slider to an adhesion feature of the gimbal tongue, the adhesion feature comprising a plurality of cantilevered tabs extending into the aperture of the gimbal tongue.

14. The system of claim 13, wherein the microactuator comprises a first actuating layer and a second actuating layer each spanning from a flexure body to the gimbal tongue.

15. The system of claim 13, wherein a bottom surface of the gimbal tongue comprises a contour feature aligned with the slider, the bottom surface contacting the adhesive layer and facing the slider.

16. The system of claim 15, wherein the contour feature has a continuously curvilinear cross-sectional shape.

17. A method comprising:

suspending a flexure from a load beam;

mounting a slider to a gimbal tongue of the flexure with an adhesive layer, the slider aligned with an aperture of the gimbal tongue, the adhesive layer attaching the slider to a first adhesion feature and a second adhesion feature of the gimbal tongue, the first adhesion feature comprising a plurality of cantilevered tabs extending into the aperture of the gimbal tongue, the second adhesion feature comprising a hole extending through the gimbal tongue, the first and second adhesion features being symmetrical about a longitudinal axis of the gimbal tongue; and activating a transducing component of the slider to conduct data access operations on a data storage medium separated from the slider by an air bearing.

18. The method of claim 17, wherein the data access operations involve heating the data storage medium with a write-assist assembly positioned on the slider.

19. The method of claim 17, wherein the data access operations involve tilting the gimbal tongue with a microactuator attached to the flexure.

20. The method of claim 17, wherein the adhesive layer is heated prior to the activating step to flow to continuously contact bottom, sidewall, and top surfaces of the gimbal tongue.

* * * * *